United States Patent
Chae

(10) Patent No.: US 7,853,256 B2
(45) Date of Patent: Dec. 14, 2010

(54) MOBILE INTERNET SYSTEM, MOBILE COMMUNICATION TERMINAL THEREOF AND OPERATION CONTROL METHOD THEREOF

(75) Inventor: Soo Jin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 1021 days.

(21) Appl. No.: 11/604,206

(22) Filed: Nov. 27, 2006

(65) Prior Publication Data
US 2007/0123255 A1  May 31, 2007

(30) Foreign Application Priority Data
Nov. 25, 2005  (KR) ............... 10-2005-0113260

(51) Int. Cl.
*H04W 4/00* (2009.01)
(52) U.S. Cl. ............ 455/434; 455/41.2; 455/67.11; 455/436; 455/515; 370/338; 370/331
(58) Field of Classification Search ............ 455/434, 455/41.2, 436, 67.11; 370/338, 328, 331
See application file for complete search history.

(56) References Cited

U.S. PATENT DOCUMENTS

| | | | | |
|---|---|---|---|---|
| 5,809,419 | A * | 9/1998 | Schellinger et al. ......... | 455/434 |
| 7,020,439 | B2 * | 3/2006 | Sinivaara et al. ........... | 455/41.2 |
| 7,231,209 | B2 * | 6/2007 | Blom et al. ................. | 455/420 |
| 7,421,248 | B1 * | 9/2008 | Laux et al. ................ | 455/67.11 |
| 7,433,345 | B2 * | 10/2008 | Kim .......................... | 370/341 |
| 7,453,840 | B1 * | 11/2008 | Dietrich et al. ............ | 370/328 |
| 7,483,700 | B2 * | 1/2009 | Buchwald et al. .......... | 455/434 |
| 7,630,713 | B2 * | 12/2009 | Cromer et al. ............. | 455/434 |
| 2002/0114350 | A1 * | 8/2002 | Tang et al. ................. | 370/469 |
| 2003/0003910 | A1 * | 1/2003 | McClure .................... | 455/435 |
| 2006/0030309 | A1 | 2/2006 | Lee et al. | |
| 2006/0209753 | A1 * | 9/2006 | Patel ......................... | 370/329 |
| 2008/0117862 | A1 * | 5/2008 | Yeshayahu et al. ......... | 370/328 |
| 2008/0186917 | A1 * | 8/2008 | Wu et al. .................... | 370/331 |
| 2009/0042566 | A1 * | 2/2009 | Brandt ....................... | 455/434 |
| 2009/0075653 | A1 * | 3/2009 | Yeom ........................ | 455/434 |
| 2009/0103501 | A1 * | 4/2009 | Farrag et al. .............. | 370/337 |

(Continued)

FOREIGN PATENT DOCUMENTS

EP        1458209 A2    9/2004

(Continued)

OTHER PUBLICATIONS

Kim et al., A Seamless Handover Mechanism for IEEE 802.16e Broadband Wireless Access Networks, pp. 1-10, (Aug. 3, 2004), XP002428889.

(Continued)

*Primary Examiner*—Sharad Rampuria
(74) *Attorney, Agent, or Firm*—Birch, Stewart, Kolasch & Birch, LLP

(57) ABSTRACT

A mobile internet system, mobile communication terminal thereof and method of controlling operation thereof are disclosed. According to an embodiment, the mobile internet system includes a mobile communication terminal configured to execute at least one of a scanning procedure and a ranging procedure. The mobile communication terminal first executes the scanning procedure rather than the ranging procedure in an interval where the scanning procedure and the ranging procedure are overlapped with each other.

19 Claims, 5 Drawing Sheets

U.S. PATENT DOCUMENTS

2009/0323609 A1* 12/2009 Walton .................. 370/329

FOREIGN PATENT DOCUMENTS

| KR | 10-2002-0013144 | A | 2/2002 |
|----|-----------------|---|--------|
| KR | 10-2005-0061250 | A | 6/2005 |
| KR | 10-2005-0079847 | A | 8/2005 |
| KR | 10-2006-0012849 | A | 2/2006 |
| KR | 10-2006-0038727 | A | 5/2006 |
| WO | WO-2006/080676  | A1 | 8/2006 |
| WO | WO 2006080676   | A1 * | 8/2006 |

OTHER PUBLICATIONS

Kim et al., IEEE 802.16e Reporting of Scanning Result, (May 13, 2003), XP002331125.

Sungjin Lee et al., IEEE 802.16E-04/167R1, "Enhancement of Scanning and Association using SCAN-REQ/RSP", (Jun. 25, 2004), XP002346472.

Itzik Kitroser, IEEE C802.16E-03/55,Online (Sep. 11, 2003), XP002437277.

* cited by examiner

MOBILE INTERNET SYSTEM, MOBILE COMMUNICATION TERMINAL THEREOF AND OPERATION CONTROL METHOD THEREOF

This application claims the priority benefit of the Korean Patent Application No. 10-2005-0113260, filed on Nov. 25, 2005 in Republic of Korea, which is hereby incorporated by reference as if fully set forth herein.

BACKGROUND OF THE INVENTION

1. Field of the Invention

The present invention relates to a mobile internet system, and more particularly, to a mobile internet system and method of controlling operation thereof. Although the present invention is suitable for a wide scope of applications, it is particularly suitable to ensure an efficient operation of a mobile communication terminal during a period of time where scanning and ranging procedures are overlapped with each other in the mobile internet system including the mobile communication terminal performing the scanning and ranging procedures.

2. Discussion of the Related Art

Generally, a mobile terminal enables massive data to be exchanged with a base station at high speed via mobile Internet. There are communication specifications using the mobile Internet such as World Interoperability for Microwave Access (hereinafter abbreviated as WiMAX), Wireless Broadband (hereinafter abbreviated as WiBro) and the like.

The WiMAX is the technical specification developed by many providers in the WiMAX Forum to be taken as the standard for mobile Internet. The WiMAX compensates for the conventional wireless LAN technology by extending the Internet-available range outside buildings considerably.

The WiBro is the wireless mobile Internet solution developed by Ministry of Information and Communication of Republic of Korea, Telecommunication Technology Association (TTA) and mobile communication providers. The WiBro provides a service for mobile ultra-high-speed Internet.

So, the service via mobile Internet enables static or mobile wireless Internet access at high speed using such a mobile Internet terminal as a handset, a laptop, a personal mobile information terminal, a PDA (personal digital assistant), a smart phone, etc.

A mobile communication terminal implementing the mobile internet service transmits a ranging request message to a base station periodically or in case of initialization to decide a network delay or to make a request for the change of power and downlink burst profile.

The mobile communication terminal then executes the ranging procedure in case of receiving a response message to the ranging request message from the base station. In this case, the ranging procedure is periodically executed.

If the signal strength of a base station (hereinafter referred to as a 'serving base station') that is exchanging data via mobile internet is irregular or weak, the mobile communication terminal transmits a scanning request message to the serving base station. When a scanning response message corresponding to the scanning request message is received from the serving base station, the mobile communication terminal performs the scanning procedure for a scan duration allocated via the response message. In this case, at least one or more scan durations are set up.

According to the related art, if the mobile communication terminal is authorized to perform the scanning procedure when it is performing the ranging procedure, the mobile communication terminal keeps performing the ongoing ranging procedure instead of switching to and performing the scanning operation for the allocated scan duration.

If the mobile communication terminal is authorized to perform the ranging procedure when it is performing the scanning procedure, the mobile communication terminal stops the ongoing scanning procedure and then preferentially executes the ranging procedure.

In other words, in case that there occurs a duration where the ranging and scanning procedures are overlapped with each other (i.e., both the ranging and scanning procedures are to be performed at a given time), the mobile communication terminal preferentially and always executes the ranging procedure over the scanning procedure. Then the mobile communication terminal is able to execute the scanning procedure after the ranging procedure has been performed and completed. In this case, however, the mobile communication terminal may have a problem that a scan duration has to be re-allocated.

Moreover, if the scanning procedure is interrupted, the mobile communication terminal is unable to make a handover into a neighbor base station having a good channel status at a proper time.

SUMMARY OF THE INVENTION

Accordingly, the present invention is directed to a mobile internet system, a mobile communication terminal thereof and a method of controlling operation thereof that substantially obviate one or more problems due to limitations and disadvantages of the related art.

An object of the present invention is to provide a mobile internet system, a mobile communication terminal thereof and a method of controlling operation thereof, by which a scanning procedure can be preferentially executed if the scanning procedure is overlapped with a ranging procedure.

Another object of the present invention is to provide a mobile internet system, a mobile communication terminal and a method of controlling operation thereof, by which a particular procedure to be preferentially executed by considering a channel status can be selected if ranging and scanning procedures are overlapped with each other.

Another object of the present invention is to provide a mobile communication terminal, by which a procedure to be preferentially executed by considering a channel status can be selected and performed if ranging and scanning procedures are overlapped with each other.

A further object of the present invention is to provide a mobile communication terminal, by which a procedure proposed by a base station can be preferentially executed if ranging and scanning procedures are overlapped with each other.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile internet system according to an embodiment of the present invention includes a mobile communication terminal executing a scanning procedure and a ranging procedure, the mobile communication terminal preferentially executing the scanning procedure rather than the ranging procedure in an interval where it is decided the scanning procedure and the ranging procedure are overlapped with each other.

In another aspect of the present invention, a mobile internet system includes a base station selecting a procedure to be preferentially executed in an interval wherein a scanning procedure and a ranging procedure are overlapped with each other and a mobile communication terminal receiving a result of selecting the procedure to be preferentially executed from the base station, the mobile communication terminal executing either the scanning procedure or the ranging procedure in the interval where the scanning procedure and the ranging procedure are decided to be overlapped with each other according to the received result.

In another aspect of the present invention, a mobile internet system includes a mobile communication terminal executing a scanning procedure and a ranging procedure, the mobile communication terminal selecting a procedure to be preferentially executed in an interval where it is decided the scanning procedure and the ranging procedure are overlapped with each other, the mobile communication terminal executing either the scanning procedure or the ranging procedure according to a result of selecting.

In another aspect of the present invention, a mobile communication terminal in a mobile internet system includes a transceiver receiving a message instructing a procedure to be preferentially executed in an interval where a scanning procedure and a ranging procedure are overlapped from a base station and a control unit executing either the scanning procedure or the ranging procedure in an interval where it is decided that the scanning procedure and the ranging procedure are overlapped with each other according to the message received by the transceiver.

In another aspect of the present invention, a mobile communication terminal in a mobile internet system includes a storage unit obtaining to store channel status information for each base station and a control unit selecting a procedure to be preferentially executed from a scanning procedure and a ranging procedure using the stored channel status information in case of deciding that the scanning procedure and the ranging procedure are overlapped with each other in a prescribed interval.

In another aspect of the present invention, a method of controlling an operation in a mobile internet system, which includes a mobile communication terminal executing a scanning procedure and a ranging procedure, includes the steps of deciding whether there exists an interval where the scanning procedure and the ranging procedure are overlapped with each other in the mobile communication terminal and executing the scanning procedure preferentially rather than the ranging procedure in the interval according to a result of the deciding step.

In another aspect of the present invention, a method of controlling an operation in a mobile internet system, which includes a mobile communication terminal executing a scanning procedure and a ranging procedure, includes the steps of selecting a procedure to be preferentially executed in an interval where the scanning procedure and the ranging procedure are overlapped with each other in a base station, transmitting a result of the selecting step to the mobile communication terminal from the base station, deciding whether there exists the interval where the scanning procedure and the ranging procedure are overlapped with each other in the mobile communication terminal, and executing a procedure according to the result of the selecting step in the interval according to a result of the deciding step in the mobile communication terminal.

In a further aspect of the present invention, a method of controlling an operation in a mobile internet system, which includes a mobile communication terminal executing a scanning procedure and a ranging procedure, includes the steps of deciding whether there exists an interval where the scanning procedure and the ranging procedure are overlapped with each other in the mobile communication terminal, selecting a procedure to be preferentially executed in the interval where the scanning procedure and the ranging procedure are overlapped with each other, and executing either the scanning procedure or the ranging procedure according to a result of the selecting step.

According to another aspect of the present invention, there is provided a mobile internet system including a mobile communication terminal configured to execute at least one of a scanning procedure and a ranging procedure, wherein the mobile communication terminal first executes the scanning procedure rather than the ranging procedure in an interval where the scanning procedure and the ranging procedure are overlapped with each other.

According to another aspect of the present invention, there is provided a mobile internet system including a base station configured to select a procedure to be preferentially executed in an interval where a scanning procedure and a ranging procedure are overlapped with each other, and to transmit the procedure selection, and a mobile communication terminal configured to receive the procedure selection from the base station, and to execute either the scanning procedure or the ranging procedure in the interval where the scanning procedure and the ranging procedure are overlapped with each other according to the received procedure selection.

According to another aspect of the present invention, there is provided a mobile internet system including a mobile communication terminal configured to select, based on status information, a procedure to be preferentially executed in an interval where a scanning procedure and a ranging procedure are overlapped with each other, and to execute either the scanning procedure or the ranging procedure according to the procedure selection.

According to another aspect of the present invention, there is provided a mobile communication terminal for a mobile internet system, the mobile communication terminal including a transceiver configured to receive, from a base station, a message instructing a procedure to be preferentially executed in an interval where a scanning procedure and a ranging procedure are overlapped, and a control unit configured to execute either the scanning procedure or the ranging procedure in the interval where the scanning procedure and the ranging procedure are overlapped with each other according to the message received by the transceiver.

According to another aspect of the present invention, there is provided a mobile communication terminal for a mobile internet system, the mobile communication terminal including a storage unit configured to store channel status information for each base station, and a control unit configured to select a procedure to be preferentially executed among a scanning procedure and a ranging procedure based on the stored channel status information, if the control unit determines that the scanning procedure and the ranging procedure are overlapped with each other in a prescribed interval.

According to another aspect of the present invention, there is provided a mobile communication terminal for a mobile internet system, the mobile communication terminal including a controller configured to automatically execute a scanning procedure rather a ranging procedure in an interval where the scanning procedure and the ranging procedure are overlapped with each other.

According to another aspect of the present invention, there is provided a method of controlling an operation in a mobile internet system including a mobile communication terminal configured to execute at least one of a scanning procedure and a ranging procedure, the method including if there exists an interval where the scanning procedure and the ranging procedure are overlapped with each other, executing, by the mobile communication terminal, the scanning procedure preferentially rather than the ranging procedure in the interval.

According to another aspect of the present invention, there is provided a method of controlling an operation in a mobile internet system including a base station and a mobile communication terminal configured to execute at least one of a scanning procedure and a ranging procedure, the method including selecting, by the base station, a procedure to be preferentially executed in an interval where the scanning procedure and the ranging procedure are overlapped with each other, transmitting the selection result to from the base station to the mobile communication terminal, determining, by the mobile communication terminal, whether there exists the interval where the scanning procedure and the ranging procedure are overlapped with each other, and executing, by the mobile communication terminal, either the scanning procedure or the ranging procedure according to the received selection result.

According to another aspect of the present invention, there is provided a method of controlling an operation in a mobile internet system including a mobile communication terminal configured to execute at least one of a scanning procedure and a ranging procedure, the method including selecting, by the mobile communication terminal, a procedure to be preferentially executed in an interval where the scanning procedure and the ranging procedure are overlapped with each other, based on status information, and executing either the scanning procedure or the ranging procedure according to the selection result.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

First of all, an example of a configuration of a mobile internet system according to the present invention is explained in detail with reference to FIG. 1 as follows.

Figure 1:
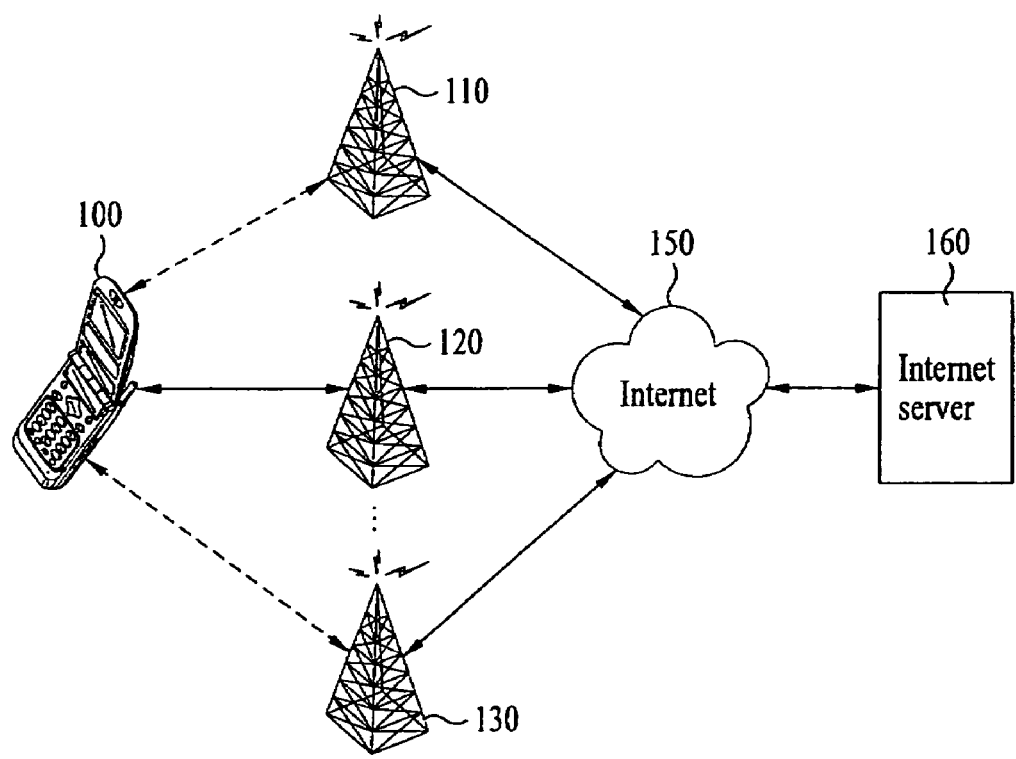
FIG. 1 is a diagram of a mobile internet system according to an embodiment of the present invention.

FIG. 1 is a diagram of a mobile internet system according to an embodiment of the present invention.

Referring to FIG. 1, the mobile internet system according to the present invention includes a mobile communication terminal 100, one or more base stations 110, 120 and 130, and an internet (network) server 160 configured to transmit data to be transmitted to the mobile communication terminal 100 to a prescribed base station via an internet (or other network) 150. The mobile communication terminal 100 is also able to transmit data to the internet server 160 via the prescribed base station as well.

All the components of the mobile internet system are operatively coupled and configured. The mobile communication terminal 100 can be a mobile phone, a smart phone, a PDA, a PMP, a DMB terminal, etc. and can include known components such as a display unit, etc.

The mobile communication terminal 100 normally transmits/receives data to/from the internet server 160 via the base station 120 that is currently connected. In this case, the currently connected base station 120 is referred to herein as a serving base station and the other base stations 110 and 130 are referred to herein as neighbor base stations.

The mobile communication terminal 100 periodically performs a ranging procedure in relation with the serving base station 120 while exchanging data with the internet server 160 through the Internet 150.

For instance, in case of entering an idle mode while exchanging data, the mobile communication terminal 100 checks whether or not a location update condition has occurred and if so, decides that the location update needs to be performed.

If the mobile communication terminal 100 decides that the location update needs to be done, the mobile communication terminal 100 transmits a message making a request for a ranging procedure (hereinafter abbreviated as 'ranging request message') to the serving base station 120.

In case of receiving a response message corresponding to the ranging request message from the serving base station 120, the mobile communication terminal 100 performs a periodic ranging procedure. Preferably, the ranging request message is the ranging request message regulated by IEEE and the response message is the ranging response message regulated by IEEE.

If the mobile communication terminal 100 decides that a channel status for the serving base station 120 is poor, the mobile communication terminal 100 can decide to make a handover via another base station. If so, prior to the execution of the handover, the mobile communication terminal 100 executes a scanning procedure to determine which base station has a good channel status.

For instance, the mobile communication terminal 100 transmits a message (hereinafter abbreviated as 'scanning request message') to receive an allocation of a scan duration, to the serving base station 120. Subsequently, the mobile communication terminal 100 receives a response message including the scan duration allocation from the serving base station 120.

The mobile communication terminal 100 then performs the scanning procedure during the allocated scan duration. In this case, preferably, the scanning request message is the scanning interval allocation request message regulated by IEEE and the response message is the scanning interval allocation response message regulated by IEEE.

In general, the ranging procedure and the scanning procedure are independently executed at different periods of time, respectively. However, the ranging and scanning procedures are occasionally overlapped with each other in a prescribed interval.

In the following description, in case that the ranging and scanning procedures are overlapped with each other, a mobile internet system operating according to the present invention is explained in detail.

Particularly, the mobile internet system according to a first embodiment of the present invention operates as follows.

First of all, the serving base station 120 transmits a message instructing to preferentially execute a scanning procedure in an interval where the scanning procedure is overlapped with a ranging procedure, to the mobile communication terminal 100. For instance, this message is a response message corresponding to a scanning request message from the mobile communication terminal 100. And, the response message includes information instructing the preferential execution of the scanning procedure using a reserved field.

Subsequently, according to the response message received from the serving base station 120, the mobile communication terminal 100 executes the scanning procedure having priority over the ranging procedure in the interval in which it is decided that the ranging and scanning procedures are overlapped with each other.

In case of not receiving the response message instructing the preferential execution of the scanning procedure from the serving base station, the mobile communication terminal 100 itself is able to decide to execute the scanning procedure having priority over the ranging procedure.

The mobile internet system according to a second embodiment of the present invention is explained as follows.

First of all, the serving base station 120 selects a procedure to be preferentially executed in an interval where scanning and ranging procedures are overlapped with each other according to channel status information received from the mobile communication terminal 100, and then transmits a result of the selection to the mobile communication terminal 100.

In an example, the channel status information is transmitted from the mobile communication terminal 100 to the serving base station 120 using a scanning result report message, or preferably by using the scanning result report message regulated by IEEE. And, the scanning result is transmitted from the serving base station 120 to the mobile communication terminal 100 using a response message corresponding to a scanning request message from the mobile communication terminal 100. Moreover, the response message includes information instructing execution of a particular procedure according to the selection result using a reserved field.

For instance, the serving base station 120 decides whether a channel status obtained from the channel status information meets a predetermined reference. If the channel status does not meet the predetermined reference, the serving station 120 selects the scanning procedure as the procedure to be preferentially executed. On the other hand, if the channel status meets the predetermined reference, the serving station 120 selects the ranging procedure as the procedure to be preferentially executed. This is because it is urgent to make a handover into a neighbor base station having a good channel status to secure a stable data transmission/reception if the channel status does not meet the predetermined reference.

Subsequently, the serving base station 120 communicates its procedure selection result to the mobile communication terminal 100. Then according to the selection result received from the serving base station 120, the mobile communication terminal 100 executes one of the scanning procedure and the ranging procedure in the interval where it is decided that the two procedures are overlapped with each other.

The mobile internet system according to a third embodiment of the present invention is explained as follows.

First of all, the mobile communication terminal 100 selects a procedure to be preferentially executed in an interval where a scanning procedure and a ranging procedure are overlapped with each other using previously obtained channel status information.

Subsequently, the mobile communication terminal 100 executes one of the scanning procedure and the ranging procedure according to the result of its procedure selection.

For instance, the mobile communication terminal 100 decides whether a channel status obtained from the previous channel status information meets a predetermined reference. If the channel status does not meet the predetermined reference, the mobile communication terminal 100 executes the scanning procedure over the ranging procedure. On the other hand, if the channel status meets the predetermined reference, the mobile communication terminal 100 executes the ranging procedure over the scanning procedure. Thus depending on the comparison result, the mobile communication terminal 100 executes either the ranging procedure or the scanning procedure during a scanning-ranging overlapping time.

A configuration of a mobile communication terminal according to the present invention is explained in detail with reference to FIG. 2 as follows.

Figure 2:
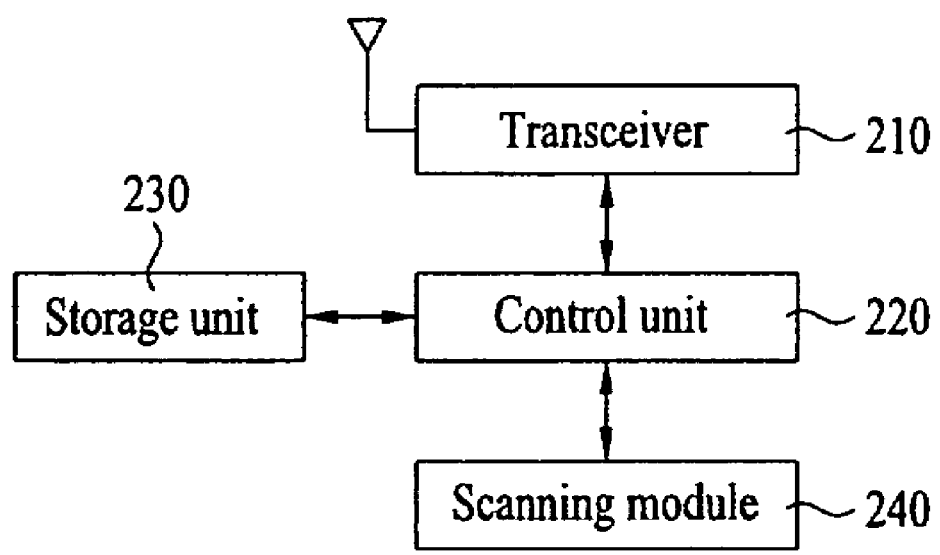
FIG. 2 is a block diagram of a mobile communication terminal according to one embodiment of the present invention.

FIG. 2 is a block diagram of an example of the mobile communication terminal 100 according to one embodiment of the present invention.

Referring to FIG. 2, the mobile communication terminal 100 according to one embodiment of the present invention includes a transceiver 210, a control unit 220, a storage unit 230 and a scanning module 240. Other components are or can be included in the mobile communication terminal 100.

The transceiver 210 transmits/receives data and messages to/from the serving base station 120. In this case, the data generally refers to, but is not limited to, data in a format of packets transmitted via the internet 150 from the internet server 160.

The control unit 220 controls the overall operation(s) of the mobile communication terminal 100. Specifically, the control unit 220 appropriately controls an operation of the mobile communication terminal 100 in case that a scanning procedure and a ranging procedure are overlapped with each other, e.g., both of these procedures are to be performed during the same given time.

The storage unit 230 stores all data inputted/outputted via the mobile communication terminal 100. Particularly, the storage unit 230 stores the procedure selection result and other data/information communicated from scanning neighbor base stations.

And, the scanning module 240 scans the neighbor base stations according to a control signal from the control unit 220.

One example of the operation of the mobile communication terminal 100 according to the present invention is now explained.

First of all, the transceiver 210 receives a message instructing a procedure to be preferentially executed in an interval where a scanning procedure and a ranging procedure are overlapped with each other from the serving base station 120.

For instance, the serving base station 120 instructs the procedure to be preferentially executed using a reserved field of the message. In particular, the serving base station 120 is able to designate the procedure to be preferentially executed among the scanning procedure and the ranging procedure by varying a value of the reserved field, and informs the mobile communication terminal 100 of the designated procedure through the message. Here, the message can be a response message transmitted from the scanning base station 120 to the mobile communication terminal 100 in response to a scanning request message transmitted by the transceiver 210 of the mobile communication terminal 100. Preferentially, the scanning request message is the scanning interval allocation request message regulated by IEEE, and the response message is the scanning interval allocation response message regulated by IEEE.

The control unit 220 executes either the scanning procedure or the ranging procedure in the interval where it is decided that the scanning procedure and the ranging procedure are overlapped with each other, according to the message received by the transceiver 210.

For instance, if the message from the scanning base station 120 instructs a preferential execution of the scanning procedure, the control unit 220 of the mobile communication terminal 100 stops the ranging procedure (if the ranging procedure is currently being performed) and then executes the scanning procedure, or continues with the scanning procedure (if the scanning procedure is currently being performed). On the other hand, if the message instructs a preferential execution of the ranging procedure, the control unit 220 stops the scanning procedure (if the scanning procedure is currently being performed) and then executes the ranging procedure, or continues with the ranging procedure (if the ranging procedure is currently being performed).

Even if the message is not received by the transceiver 210, the control unit 220 itself is able to decide to execute the scanning procedure having priority over the ranging procedure. For instance, the control unit 220 executes the scanning procedure over the ranging procedure.

Another example of the operation of the mobile communication terminal 100 according to the present invention is explained as follows.

First of all, the storage unit 230 obtains channel status information for each base station and then stores the obtained channel status information therein. In this case, it is able to represent the channel status information as RSSI (received signal strength indication) or CINR (carrier to interference and noise ratio). The channel status information can be obtained by the scanning module 240 as well.

The control unit 220 decides whether a signal from the serving base station 120 is good or bad using the channel status information and is then able to decide whether to execute a scanning procedure or a ranging procedure according to the result of this decision.

Particularly, in case of determining that the scanning procedure and the ranging procedure are overlapped with each other, the control unit 220 selects a procedure to be preferentially executed among the scanning procedure and the ranging procedure using the stored channel status information.

For instance, the control unit 220 decides whether a channel status obtained from the channel status information meets a predetermined reference (e.g., whether the channel status satisfies a certain criterion). If the channel status fails to meet the predetermined reference, the control unit 220 selects the scanning procedure as the procedure to be preferentially executed, among the scanning and ranging procedures. If the channel status meets the predetermined reference, the control unit 220 selects the ranging procedure as the procedure to be preferentially executed among the scanning and ranging procedures. In this case, the predetermined reference can mean a minimum channel status goodness required for maintaining the stable data exchange with the serving base station 120, but other reference can be used.

Then, the control unit 220 executes the scanning procedure or the ranging procedure according to the result of the selection.

A method of controlling an operation in a mobile internet system according to a first embodiment of the present invention is now explained.

Figure 3:
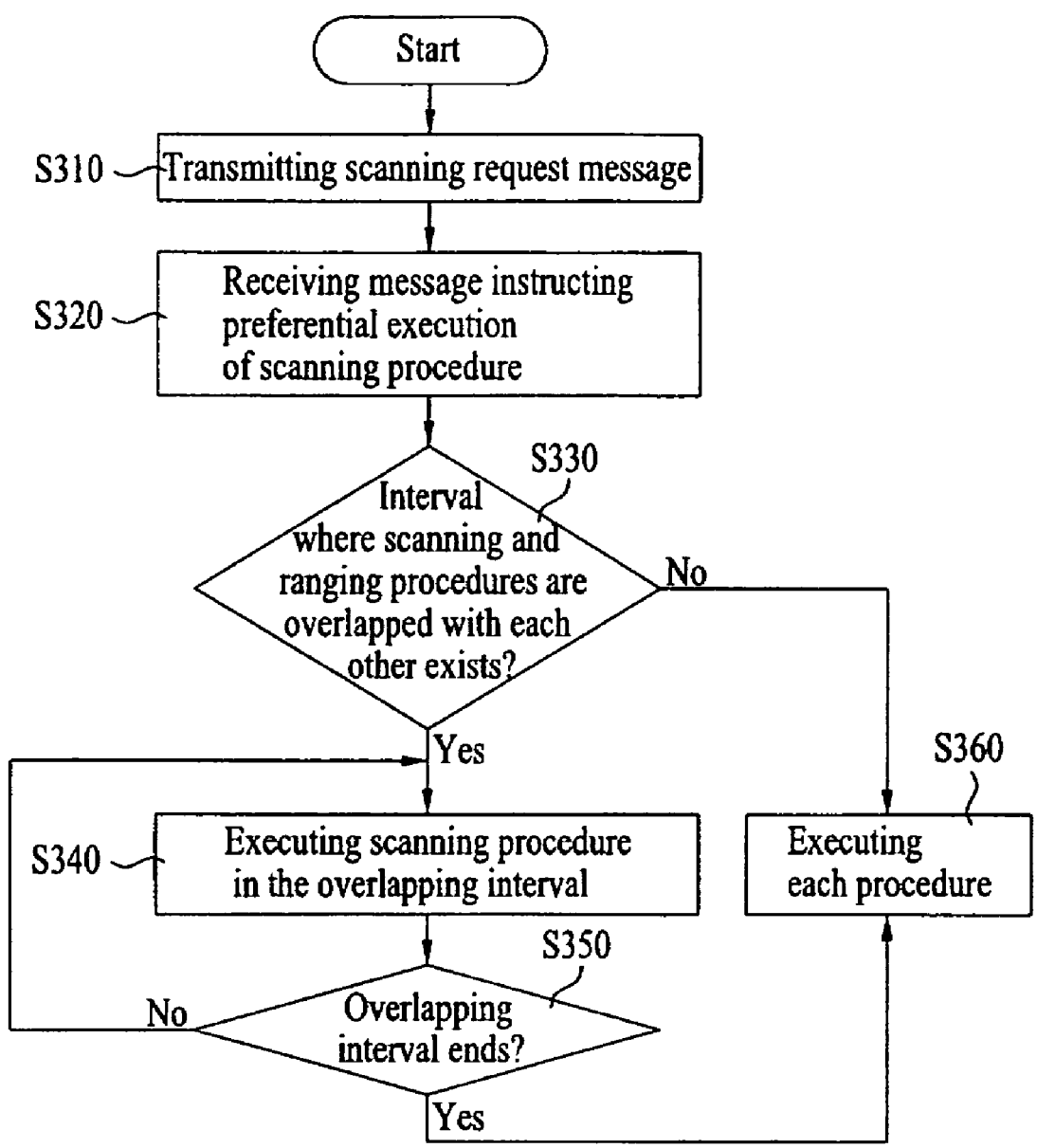
FIG. 3 is a flowchart of a method of controlling an operation in a mobile internet system according to a first embodiment of the present invention.

FIG. 3 is a flowchart of a method of controlling an operation in a mobile internet system according to a first embodiment of the present invention. This method is implemented in the mobile internet system of FIG. 1, but can be implemented in other suitable device/system.

Referring to FIG. 3, in case that a channel status for the serving base station 120 is decided to be poor, the mobile communication terminal 100 decides or can decide to make a handover via another neighbor base station 110 or 130. Prior to the execution of the handover, the mobile communication terminal 100 is able to execute a scanning procedure by receiving an allocated scan interval from the serving base station 120 to decide on a base station having a good channel status.

More particularly, the mobile communication terminal 100 transmits a message for allocation of a scanning interval (hereinafter referred to as 'scanning request message') to the serving base station 120 (S310).

Subsequently, the mobile communication terminal 100 receives a response message for the scanning interval allocation from the serving base station 120 (S320). The mobile communication terminal 100 then executes a scanning procedure during the allocated scanning interval. In this case, the scanning request message is preferably the scanning interval allocation request message regulated by IEEE, and the response message is preferably the scanning interval allocation response message regulated by IEEE. But the invention is not limited thereto.

Preferably, the message received by the mobile communication terminal 100 from the serving base station 120 in step S320 is a message instructing the mobile communication terminal 100 to preferentially execute the scanning procedure in an interval where the scanning procedure is overlapped with a ranging procedure. In this case, this message includes information instructing a preferential execution of the scanning procedure using a reserved field, but can include other information.

Subsequently, the mobile communication terminal 100 determines whether there exists an interval where the scanning and ranging procedures are overlapped with each other (S330).

If the mobile communication terminal 100 (e.g., the control unit 220) determines that there exists the interval where the scanning and ranging procedures are overlapped with each other, the mobile communication terminal 100 preferentially executes the scanning procedure rather than the ranging procedure during the overlapping interval according to the message received in step S320 from the serving base station 120 (S340).

The mobile communication terminal 100 decides whether the overlapping interval ends or not (S350). Subsequently, the mobile communication terminal 100 keeps executing the scanning procedure preferentially (S340) or independently executes the scanning procedure or the ranging procedure according to each period (S360).

On the other hand, if it is decided that there does not exist the interval where the scanning and ranging procedures are overlapped with each other at step S330, the mobile communication terminal 100 independently executes the scanning procedure or the ranging procedure according to each period (S360).

Figure 4:
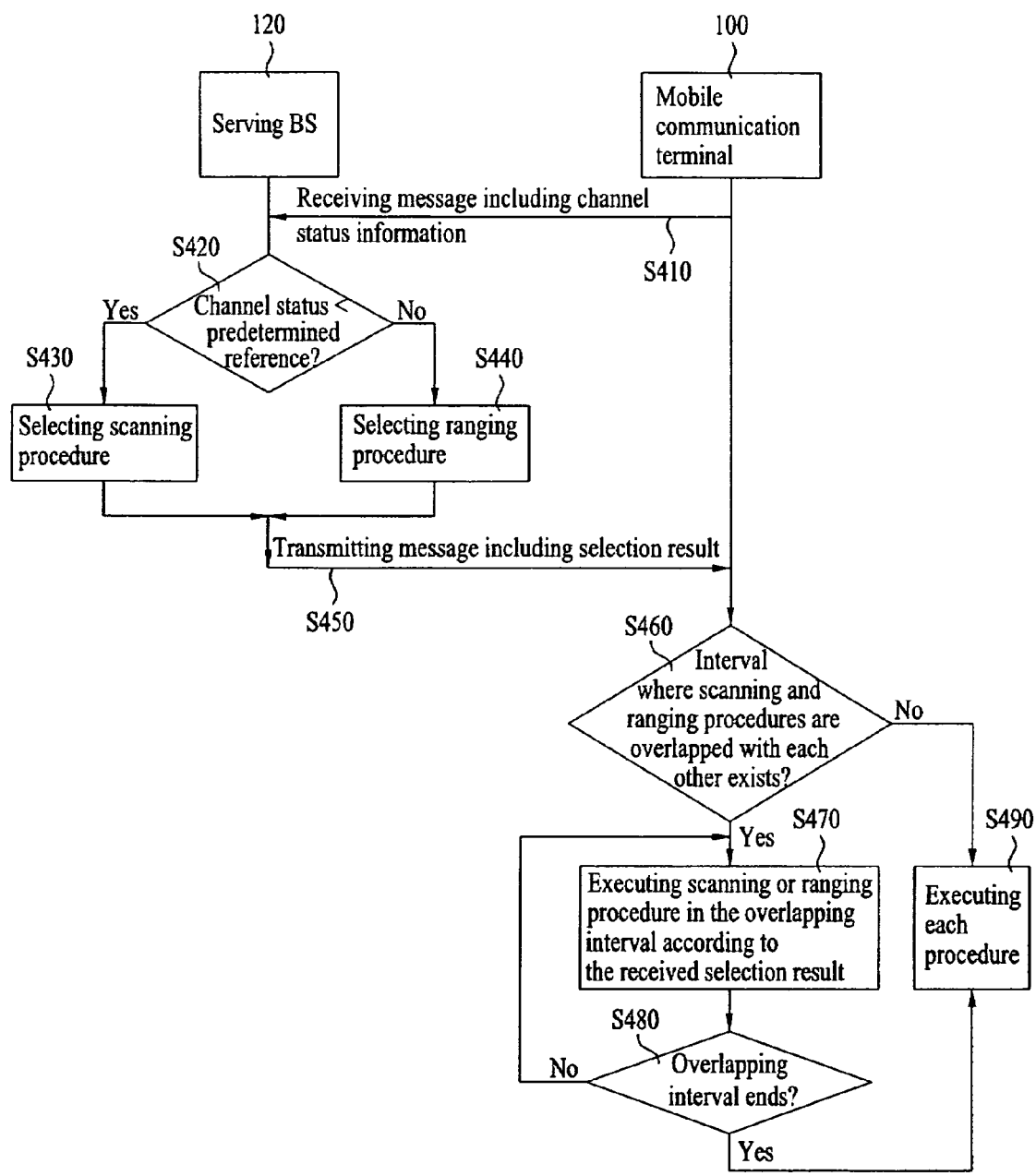
FIG. 4 is a flowchart of a method of controlling an operation in a mobile internet system according to a second embodiment of the present invention.

FIG. 4 is a flowchart of a method of controlling an operation in a mobile internet system according to a second embodiment of the present invention. This method is implemented in the mobile internet system of FIG. 1, but can be implemented in other suitable device/system.

Referring to FIG. 4, the serving base station 120 receives a message including channel status information from the mobile communication terminal 100 (S410). In this case, the received message is preferably a scanning result report message, and more preferably, the scanning result report message regulated by IEEE. But the invention is not limited thereto.

Then the serving base station 120 (e.g., its controller) selects, e.g., among a scanning procedure and a ranging procedure, the procedure to be preferentially executed in an interval where the scanning procedure and the ranging procedure are overlapped with each other. In particular, the serving base station 120 decides whether a channel status obtained from the channel status information meets a predetermined reference (S420). For instance, the serving base station 120 determines whether the channel status satisfies a certain criterion or a value associated with the channel status is at or above a desired reference level.

If it is determined at step S420 that the channel status obtained from the channel status information does not meet the predetermined reference, the serving base station 120 selects the scanning procedure as the procedure to be preferentially executed, over the ranging procedure (S430).

On the other hand, if it is determined at step S420 that the channel status obtained from the channel status information meets the predetermined reference, the serving base station 120 selects the ranging procedure as the procedure to be preferentially executed, over the scanning procedure (S440).

The present invention provides steps S420, S430 and S440 because it is urgent to make a handover into a neighbor base station having a good channel status to secure a stable data transmission/reception if the channel status does not meet the predetermined reference. At step S420, the predetermined reference represents a minimum channel status goodness required for maintaining a stable data exchange with the serving base station 120, but can other criterion.

Once the serving base station 120 selects one of the scanning procedure and the ranging procedure to be preferentially performed at step S430 or S440, the serving base station 120 transmits a message including this result of the procedure selection to the mobile communication terminal (S450). For instance, the message including the selection result can be a response message corresponding to a scanning request message from the mobile communication terminal 100. The response message can include information instructing execution of the selected procedure using a reserved field.

In case of receiving the message including the procedure selection result from the serving base station 120, the mobile communication terminal 100 determines whether there exists an interval where the scanning and ranging procedures are overlapped with each other (S460).

If the mobile communication terminal 100 determines that there exists the interval where the scanning and ranging procedures are overlapped with each other, the mobile communication terminal 100 preferentially executes the procedure according to the received selection result during the overlapping interval (S470).

The mobile communication terminal 100 then decides whether the overlapping interval ends or not (S480). Subsequently, the mobile communication terminal 100 keeps executing the procedure according to the selection result preferentially if the overlapping interval has not ended (S480) or independently executes the scanning procedure or the ranging procedure according to each period if the overlapping interval has ended (S490).

On the other hand, if the mobile communication terminal 100 determines in step S460 that there does not exist the interval where the scanning and ranging procedures are overlapped with each other, the mobile communication terminal 100 independently executes the scanning procedure or the ranging procedure according to each period (S490).

Figure 5:
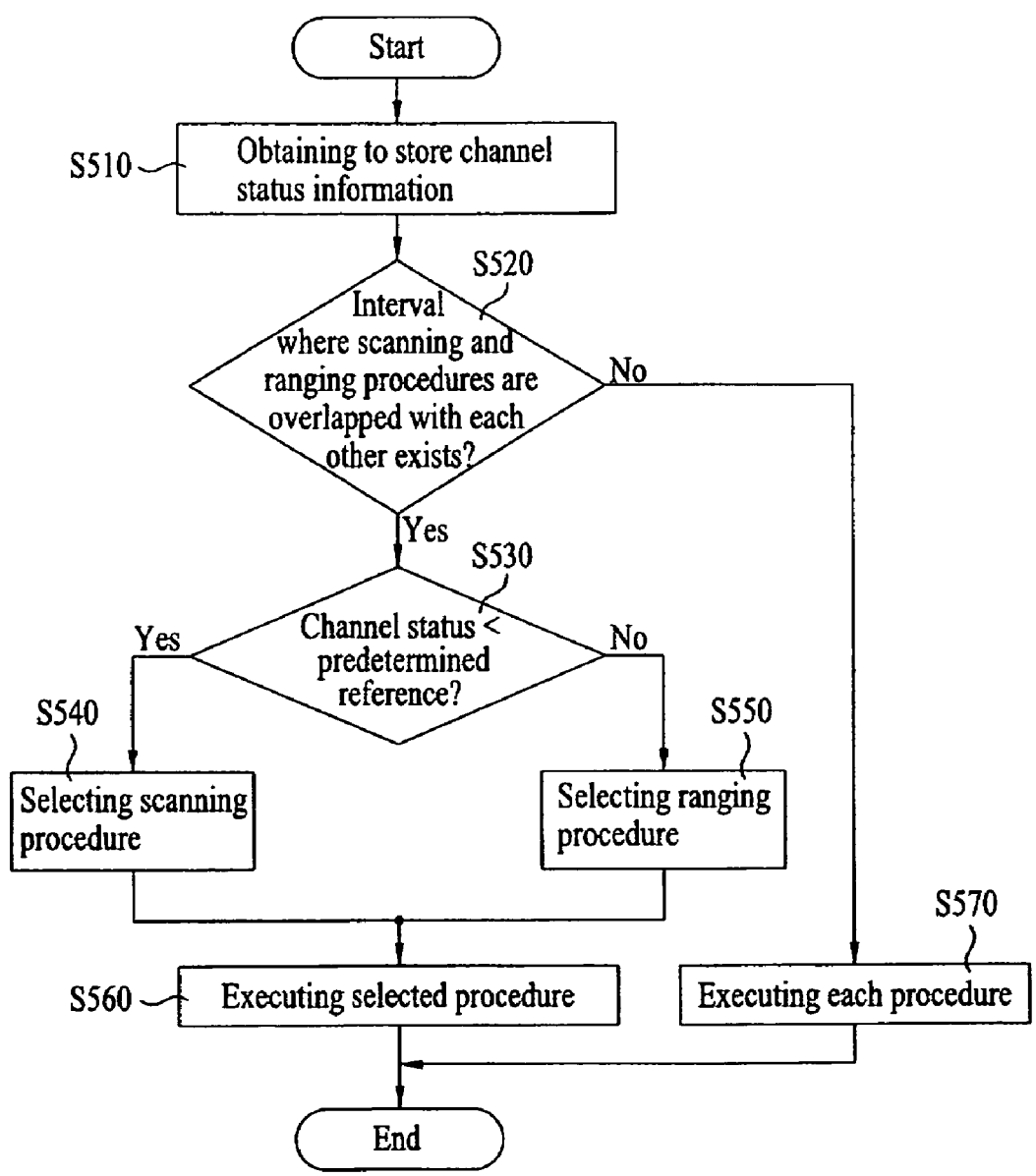
FIG. 5 is a flowchart of a method of controlling an operation in a mobile internet system according to a third embodiment of the present invention.

FIG. 5 is a flowchart of a method of controlling an operation in a mobile internet system according to a third embodiment of the present invention. This method is implemented in the mobile internet system of FIG. 1, but can be implemented in other suitable device/system.

Referring to FIG. 5, the mobile communication terminal 100 obtains channel status information for the serving base station 120 and then stores the obtained channel status information therein, e.g., in the storage unit 230 (S510). In this case, the channel status information can be represented as RSSI (received signal strength indication) or CINR (carrier to interference and noise ratio) of the serving base station 120.

Subsequently, as mentioned in the foregoing description, the mobile communication terminal 100 is able to execute the scanning procedure during a scanning interval allocated by the serving base station 120. And, the mobile communication terminal 100 is able to periodically execute a ranging procedure.

The mobile communication terminal 100 determines whether there exists an interval where the scanning procedure and the ranging procedure are overlapped with each other (S520).

In case of determining in step S520 that there exists the interval where the scanning procedure and the ranging procedure are overlapped with each other, the mobile communication terminal 100 determines whether a channel status obtained from the channel status information of the serving base stations 120 as stored in the storage unit 230 meets a predetermined reference (or satisfies a certain criterion or value). Here, the predetermined reference preferably represents a minimum channel status goodness required for maintaining a stable data exchange with the serving base station 120, but can be other criterion.

If step S530 indicates that the channel status fails to meet the predetermined reference, the mobile communication terminal 100 selects the scanning procedure as the procedure to be preferentially executed, over the ranging procedure (S540). On the other hand, if step S530 indicates that the channel status meets the predetermined reference, the mobile communication terminal 100 selects the ranging procedure as the procedure to be preferentially executed, over the scanning procedure (S550).

Thereafter, the mobile communication terminal 100 preferentially executes the selected procedure (S560).

On the other hand, if the mobile communication terminal 100 determines in step S520 that there does not exist the interval where the scanning and ranging procedures are overlapped with each other, the mobile communication terminal 100 independently executes the scanning procedure or the ranging procedure according to each period (S570).

According to the various embodiments, the present invention provides at least the following effects or advantages.

First of all, the present invention controls a mobile communication terminal to execute a scanning procedure preferentially in case that the scanning procedure is overlapped with a ranging procedure. So, it is unnecessary to have a scan duration to be re-allocated to the mobile communication terminal. And, the mobile communication terminal is able to make a handover into another base station having a good channel status quickly.

Secondly, a serving base station is able to select a procedure to be preferentially executed in case that a scanning procedure and a ranging procedure are overlapped with each other. So, a mobile communication terminal is able to preferentially execute a procedure most suitable for a current network environment.

Thirdly, a mobile communication terminal is able to select a procedure to be preferentially executed in case that a scanning procedure and a ranging procedure are overlapped with each other. So, the mobile communication terminal is able to make a quick handover into a base station having a good channel status if necessary.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile internet system, comprising:
    a mobile communication terminal configured to receive a message instructing to execute the scanning procedure preferentially in the interval where a scanning procedure and a ranging procedure are overlapped with each other and to execute at least one of the scanning procedure and the ranging procedure,
    wherein the mobile communication terminal is configured to first execute the scanning procedure rather than the ranging procedure in an interval when the scanning procedure and the ranging procedure are overlapped with each other and according to channel status information,
    wherein the mobile communication terminal executes the scanning procedure over the ranging procedure, if the message is received from the base station.

2. The mobile internet system of claim 1, further comprising:
    a base station configured to transmit the message instructing to execute the scanning procedure preferentially in the interval where the scanning procedure and the ranging procedure are overlapped with each other.

3. The mobile internet system of claim 1, wherein the message is a response message responsive to a scanning request message transmitted from the mobile communication terminal to the base station.

4. A mobile internet system, comprising:
    a base station configured to receive channel status information from a mobile communication terminal and to select one of a scanning procedure and a ranging procedure to be preferentially executed in an interval according to the received channel status information where the scanning procedure and the ranging procedure are overlapped with each other, and to transmit a corresponding procedure selection; and
    the mobile communication terminal, the mobile terminal configured to receive the procedure selection from the base station, and to execute either the scanning procedure or the ranging procedure in the interval where the scanning procedure and the ranging procedure are overlapped with each other according to the received procedure selection.

5. The mobile internet system of claim 4, wherein the mobile communication terminal transmits the channel status information to the base station using a scanning result report message.

6. The mobile internet system of claim 4, wherein the base station transmits the procedure selection to the mobile communication terminal using a response message responsive to a scanning request message transmitted from the mobile communication terminal to the base station.

7. A mobile internet system including a base station configured to transmit a procedure selection instruction, comprising:
    a mobile communication terminal configured to receive the procedure selection instruction and to select, based on status information and the procedure selection instruction, one of a scanning procedure and a ranging procedure to be preferentially executed in an interval where the scanning procedure and the ranging procedure are overlapped with each other, and to execute either the scanning procedure or the ranging procedure according to the procedure selection,
    wherein the status information is previously obtained channel status information, and the mobile communication terminal compares a channel status obtained from the channel status information with reference information and the procedure selection instruction to make the procedure selection.

8. A mobile communication terminal for a mobile internet system, the mobile internet system including a base station, the mobile communication terminal comprising:
    a transceiver configured to receive, from the base station, a message including an instruction for selecting a procedure to be preferentially executed in an interval where a scanning procedure and a ranging procedure are overlapped; and
    a control unit configured to execute either the scanning procedure or the ranging procedure in the interval when the scanning procedure and the ranging procedure are overlapped with each other according to the instruction received by the transceiver from the base station and in accordance with channel status information.

9. The mobile communication terminal of claim 8, wherein the received message is a response message responsive to a scanning request message transmitted to the base station by the transceiver.

10. A mobile communication terminal for a mobile internet system, the mobile internet system including plural base stations, the mobile communication terminal comprising:
    a storage unit configured to store channel status information for each of the plural base stations; and
    a control unit configured to receive a procedure selection instruction from one of the plurality of base stations and to select and execute a procedure to be preferentially executed among a scanning procedure and a ranging procedure based on the stored channel status information and the received procedure selection instruction, if the control unit determines that the scanning procedure and the ranging procedure are overlapped with each other in a prescribed interval.

11. A mobile communication terminal for a mobile internet system, the mobile internet system including a base station configured to transmit a procedure selection message to the mobile communication terminal, the mobile communication terminal comprising:
  a controller configured to receive the procedure selection message from the base station and to automatically execute a scanning procedure preferentially rather than a ranging procedure in an interval where the scanning procedure and the ranging procedure are overlapped with each other and in accordance with stored or received channel status information and the procedure selection message.

12. A method of controlling an operation in a mobile internet system including a base station and a mobile station, the mobile communication terminal configured to execute at least one of a scanning procedure and a ranging procedure, the method comprising:
  receiving, by the mobile communication terminal from the base station, a message instructing the mobile communication terminal to execute the scanning procedure preferentially in an interval where the scanning procedure and the ranging procedure are overlapped with each other; and
  if the interval exists, executing, by the mobile communication terminal, the scanning procedure preferentially rather than the ranging procedure in the interval based on stored or received channel status information and in response to the received message.

13. The method of claim 12, wherein the received message is a response message responsive to a scanning request message transmitted from the mobile communication terminal to the base station.

14. A method of controlling an operation in a mobile internet system including a base station and a mobile communication terminal configured to execute at least one of a scanning procedure and a ranging procedure, the method comprising:
  receiving, by the base station, channel status information from the mobile communication terminal;
  selecting, by the base station based on the channel status information received from the mobile communication terminal, one of the scanning procedure and the ranging procedure to be preferentially executed in an interval where the scanning procedure and the ranging procedure are overlapped with each other;
  transmitting a corresponding selection result, by the base station, to the mobile communication terminal;
  determining, by the mobile communication terminal, whether there exists the interval where the scanning procedure and the ranging procedure are overlapped with each other; and
  executing, by the mobile communication terminal, either the scanning procedure or the ranging procedure according to the received selection result.

15. The method of claim 14, wherein the channel status information is transmitted from the mobile communication terminal to the base station using a scanning result report message.

16. The method of claim 14, wherein in the transmitting step, the selection result is transmitted from the base station to the mobile communication terminal using a response message responsive to a scanning request message sent from the mobile communication terminal to the base station.

17. A method of controlling an operation in a mobile internet system including a base station and a mobile communication terminal configured to execute at least one of a scanning procedure and a ranging procedure, the method comprising:
  selecting, by the mobile communication terminal, one of the scanning procedure and the ranging procedure to be preferentially executed in an interval where the scanning procedure and the ranging procedure are overlapped with each other, based on status information and a procedure selection instruction received from the base station; and
  executing either the scanning procedure or the ranging procedure according to the selection result,
  wherein the selecting step includes:
    comparing a channel status obtained from the status information with reference information and the procedure selection instruction, and
    selecting either the scanning procedure or the ranging procedure according to the comparison result, as the procedure to be preferentially executed in the interval.

18. The method of claim 17, wherein the ranging procedure is selected as the procedure to be preferentially executed in the interval, if the channel status satisfies the reference information.

19. The method of claim 17, wherein the scanning procedure is selected as the procedure to be preferentially executed in the interval, if the channel status does not satisfy the reference information.

* * * * *